United States Patent
Berneth et al.

(10) Patent No.: US 7,022,460 B2
(45) Date of Patent: *Apr. 4, 2006

(54) ERASABLE OPTICAL RECORDING MATERIAL FOR BLUE LASERS

(75) Inventors: Horst Berneth, Leverkusen (DE); Thomas Bieringer, Odenthal (DE); Rainer Hagen, Leverkusen (DE); Serguei Kostromine, Swisttal (DE)

(73) Assignee: Bayer Aktiengesellschaft, Leverkusen (DE)

(*) Notice: Subject to any disclaimer, the term of this patent is extended or adjusted under 35 U.S.C. 154(b) by 186 days.

This patent is subject to a terminal disclaimer.

(21) Appl. No.: 09/937,999

(22) PCT Filed: Sep. 27, 2001

(86) PCT No.: PCT/EP00/02385

§ 371 (c)(1),
(2), (4) Date: Sep. 27, 2001

(87) PCT Pub. No.: WO00/60586

PCT Pub. Date: Oct. 12, 2000

(65) Prior Publication Data

US 2004/0214106 A1    Oct. 28, 2004

(30) Foreign Application Priority Data

Mar. 30, 1999  (DE)  ................. 199 14 325

(51) Int. Cl.
G11B 7/24    (2006.01)

(52) U.S. Cl. .............. 430/270.14; 430/945; 430/19; 369/284; 428/642

(58) Field of Classification Search .............. 430/1, 430/19, 945, 270.14
See application file for complete search history.

(56) References Cited

U.S. PATENT DOCUMENTS 5,024,784 A    6/1991   Eich et al. ............. 252/299.01

(Continued)

FOREIGN PATENT DOCUMENTS

DE    276277    2/1990

(Continued)

OTHER PUBLICATIONS

Eich et al., "Erasable holograms in polymeric liquid crystals", Makromol. Chem., Rapid Commun., vol. 8, pp. 467-471 (1987).*

(Continued)

*Primary Examiner*—Martin Angebranndt
(74) *Attorney, Agent, or Firm*—Joseph C. Gil; Aron Preis; James R. Franks (57) ABSTRACT

An optical recording material for binary, multibit or volume data storage is described. The optical recording material comprises: (a) at least one dyestuff selected from polymeric azo dyestuffs and oligomeric azo dyestuffs, the dyestuff changing its spatial arrangement upon irradiation with polarized electromagnetic radiation; and (b) optionally at least one grouping having form anisotropy. The optical recording material has the following characteristics: (i) the absorption maximum of the dyestuff(s) is at least 30 nm less than 400 nm and/or at least 30 nm greater than 400 nm; (ii) at 400 nm the dyestuff reaches an optical density of not more than 60% of its absorption maximum; (iii) the optical recording material has the capacity for being rewritten on by changing the state of polarization of actinic light, an intensity of at least 80% of the original value being achieved after a deletion/rewriting cycle; and (iv) at 400 nm, under identical conditions, an optical writing operation performed upon the optical recording material proceeds no more slowly than at 500 nm, and birefringence values induced during the optical writing operation do not differ from those birefringence values induced at 500 nm by more than 10%.

12 Claims, 1 Drawing Sheet

U.S. PATENT DOCUMENTS

| | | | |
|---|---|---|---|
| 5,098,978 A | 3/1992 | Riepl et al. | 528/15 |
| 5,173,381 A | 12/1992 | Natansohn et al. | 430/19 |
| 5,384,221 A | 1/1995 | Savant et al. | 430/19 |
| 5,496,670 A | 3/1996 | Hvilsted et al. | 430/56 |
| 5,543,267 A | 8/1996 | Stumpe et al. | 430/290 |
| 5,641,846 A | 6/1997 | Bieringer et al. | 526/292.2 |
| 5,858,585 A | 1/1999 | Haarer et al. | 430/20 |
| 2003/0049549 A1* | 3/2003 | Hagen et al. | 430/19 |
| 2003/0113664 A1* | 6/2003 | Berneth et al. | 430/270.14 |
| 2003/0183959 A1* | 10/2003 | Berneth et al. | 264/1.33 |
| 2003/0191240 A1* | 10/2003 | Berneth et al. | 525/50 |

FOREIGN PATENT DOCUMENTS

| | | | |
|---|---|---|---|
| DE | 4339862 | * | 10/1994 |
| DE | 4431823 | * | 3/1996 |
| DE | 19706029 | | 8/1998 |
| DE | 19720288 | | 11/1998 |
| EP | 0 823 442 | | 2/1998 |
| SU | 887574 | | 12/1981 |
| WO | 98/51721 | * | 11/1998 |

OTHER PUBLICATIONS

Makromol. Chem. 185, (month unavailable) 1984, pp. 1327-2334, Electro-optical effects of azo Dyes containing liquid containing liquid crystalline copolymers, Helmut Ringsdorf and Hans-Wwerner Schmidt.

Europe Polym. 18, (month unavailable) 1982, pp. 559-561, Ahmed Akelah, Preparation of Vinyl Ethers and Thioethers Using Polymers-Supported Phosphonium Salts.

**Menzel H. et al: "Langmiur-Blodgett Films of Photochromic Polyglutamates. \4. Spectroscopic And Long Alkyl Chains", Macromolecules, US, American Chemical Society. Easton, Bd. 26, Nr. 14, Jul. 5, 1993, Seitein 3644-3649, XP000381886.

**Stumpe J. et al: "Photo-Orientation in Amorphous and Aligned Films of Photochromic Liquid Crystalline Polymers" Thin Solid Films, CH, Elsevier-Sequoia S.A. Lausannne, Bd. 284/285 Sep. 15, 1996, Seiten 252-256. XP000685386.

**Holme N.C.R. et al: "Photoinduced Anisotropy Measurements in Liquid-Crystalline Azobenzene Side-Chain Polyesters" Applied Optics, US Optical Society of America, Washingtion, Bd. 35, Nr. 23, Aug. 10, 1996, Seiten 4622-4627, XP000623814.

Liquid Crystals, vol. 2, No. 2, (month unavailable) 1987, S.G. Kostromin, V. Shibaev and N.Z. Plate, Thomotropic liquid-crystalline polymers XXXVI. Synthesis of comb-like polymers with oxygen containing spacers and study of their phase transitions.

\* cited by examiner

Fig. 1

ERASABLE OPTICAL RECORDING MATERIAL FOR BLUE LASERS

CROSS REFERENCE TO RELATED PATENT APPLICATIONS

The present patent application claims the right of priority under 35 U.S.C. 119 (a)–(d) and 35 U.S.C. 365 of International Application No. PCT/EP00/02385, filed 17 Mar. 2000, which was published in German as International Patent Publication No. WO 00/60586 on 12 Oct. 2000, which is entitled to the right of priority of German Patent Application No. 199 14 325.0, filed 30 Mar. 1999.

FIELD OF THE INVENTION

The present invention relates to an optical recording material for binary and/or multibit and/or volume data storage, the preparation thereof and its use as a storage material at wavelengths of about 400 nm.

BACKGROUND OF THE INVENTION

Materials for binary and/or multibit and/or volume data storage which have azo dyestuffs as antennae for the incident light already exist in the prior art. In particular, the class of side chain polymers in which, in addition to the azo dyestuffs, components having form anisotropy are also used as side chains, is distinguished by the level of the birefringence which can be induced by light. In these materials, the dyestuffs, in combination with components having form anisotropy, bring about an orientation in the actinic light field if they are irradiated with polarized light of a suitable wavelength: A light-induced birefringence builds up.

U.S. Pat. No. 5,384,221 describes an optical recording material for binary and/or multibit and/or volume data storage comprising at least one polymeric and/or oligomeric azo dyestuff which changes its spatial arrangement on irradiation with polarised electromagnetic radiation, and optionally at least one grouping having form anisotropy.

However, these materials do not meet all requirements, and in particular, because of their absorption properties (too high an optical density) at 400 nm, they cannot be used for data storage: In reflection constructions, the actinic light is already noticeably absorbed in the recording layers after a few layers of atoms, and the actinic light cannot act on the complete thickness of the recording material. This means on the one hand that during storage of optical information a significant increase in the sample temperature occurs due to the absorption of light. A significant increase in the sample temperature is understood as meaning a temperature increase of at least 20° C., more precisely of at least 50° C., in particular of more than 100° C., and especially particularly of at least 140° C. This increase in temperature can be measured, for example, with an IR thermal head (Inframetrics Thermocam PM 290).

On the other hand, the high absorption impedes reading of the light-induced information with the wavelengths which have been used for writing: The light arriving from the recording material at the detection construction is too weak still to have an adequate signal/noise ratio. An adequate signal/noise ratio exists when the intensity of the detected light stands out from the scatter background by an order of magnitude.

These known materials sometimes do not show an adequate capacity for being rewritten on: It has already been shown that in the case of irradiation with linearly polarized light the previously induced birefringence can be deleted by rotating the direction of polarization of the actinic light by, for example, 90°. Alternatively, the birefringence can be reduced, for example, by using circularly polarized light. During a renewed writing operation, however, on irradiation with linearly polarized light, in the prior art the birefringence value such as has been achieved during writing on an isotropic sample is not produced.

For the abovementioned reasons (too high an optical density), rewriting on was not possible, especially at wavelengths of about 400 nm.

The capacity for being written on at 400 nm is of great importance, however, for the use of the blue laser diodes (NICHIA) which have just become commercially obtainable, since these laser diodes allow the generation of high storage densities.

SUMMARY OF THE INVENTION

There was accordingly the need for a recording material which can be used for optical data storage for the wavelength range of blue laser diodes. This material should achieve in puncto light-inducible birefringence of comparable values on exposure in the blue spectral range (about 400 nm) to those on exposure in the green spectral range (about 515 nm). It should furthermore have a capacity for being rewritten on.

It has been found, surprisingly, that the recording materials described in this application meet the stated requirements.

The invention accordingly provides an optical recording material which can be employed for binary and/or multibit and/or volume data storage and comprises at least one polymeric and/or oligomeric azo dyestuff which changes its spatial arrangement on irradiation, and optionally at least one grouping having form anisotropy. The recording material is characterized in that the absorption maximum of the dyestuff is at least 30 nm, preferably 40 nm, different from 400 nm and at 400 nm the dyestuff reaches an optical density of not more than 60% of its absorption maximum and there is the capacity for being rewritten on by changing the state of polarization of the actinic light, an intensity of at least 80% of the original value being achieved after a deletion/rewriting cycle, and wherein at 400 nm, under otherwise identical conditions, the writing operation proceeds no more slowly than at 500 nm, and birefringence values induced here do not differ from those birefringence values induced at 500 nm by more than 10%.

DETAILED DESCRIPTION OF THE INVENTION

This is achieved e.g. by polymers in which the absorption maximum (AM) of the dyestuff is less than 370 nm, preferably 360 nm.

However, it is also possible that polymers and/or oligomers in which the absorption maximum of the dyestuff is greater than 450 nm are used.

Very good results have been achieved if the recording material comprises a copolymer which comprises at least one component in which the AM is greater than 450 nm and at least one component in which the AM is less than 360 nm.

Particularly advantageous effects can be achieved if the absorption band with the maximum absorption is particularly narrow.

Furthermore, it is to be noted in particular that the recording material according to the invention has, in the solid state at a thickness of 250 nm, an optical density of $\leq 1$ preferably less than or equal to 0.5, especially preferably less than or equal to 0.3, at a wavelength in a wavelength range of 380 to 420 nm, preferably 390 to 410 nm, especially preferably 395 to 405 nm.

The optical density can be determined with commercial UV/VIS spectrometers (e.g. CARY, 4G, UV/VIS spectrometer).

If this is ensured, the effects according to the invention can be achieved in a favourable manner by treating the recording material with electromagnetic radiation (light) in the wavelength range of lasers of preferably between 380 to 420 nm, particularly preferably between 390 and 410 nm, especially preferably between 395 and 405 nm.

In the most favourable case, the reading process should be carried out with light of the same wavelength. If this is not possible in some cases, the wavelength can be longer, but the wavelength should preferably be only slightly longer.

The reorientation of the dyestuff after exposure to actinic light results, for example, from polarized absorption spectroscopy studies: A sample previously exposed to actinic light is investigated between 2 polarizers in a UV/VIS spectrometer (e.g. CARY 4G, UV/VIS spectrometer) in the spectral range of the absorption of the dyestuffs. On rotation of the sample around the perpendicular to the sample and with a suitable position of the polarizers, for example in the crossed state, the reorientation of the dyestuff follows from the course of the intensity of the extinction as a function of the sample angle and as a result can be determined unambiguously.

An important parameter which acquires importance even more often in the following is the orientation of the longitudinal axis of the molecules. The longitudinal axis of the molecules can be determined, for example, with the aid of the molecular shape by molecular modelling (e.g. CERIUS$^2$).

An important parameter of the dyestuffs according to the invention is their sensitivity to actinic light after the writing operation.

The holographic sensitivity, for example, is a measure of the sensitivity of a molecule to actinic light. It is calculated, for example, from the holographic growth curve, that is to say the evolution of the diffraction efficiency (=diffracted intensity with respect to the incident intensity of the reading laser) as a function of the energy deposited by the writing beams. The sensitivity is defined as the increase in the root of the diffraction efficiency according to the energy deposited, standardized to the thickness of the storage medium.

At the microscopic level, sensitivity means the probability that a photon converts a molecule from the electronic base state into an excited state, which as a rule is described with a cis-configuration.

The dyestuff decreases its absorption properties, in particular its sensitivity to actinic light, for example by folding in the direction perpendicular to the direction of polarization of the actinic light and by its longitudinal molecular axis coming to lie at an angle to the direction of polarization of the actinic light of between 10° and 90°, preferably between 50° and 90°, particularly preferably between 75° and 90°, and especially preferably between 85° and 90°. Such dyestuffs are then no longer available for further writing operations if components of the polarizability tensor can no longer react with the actinic light, and on renewed writing after a deletion operation the birefringence value achieved during the previous writing is no longer achieved. Such dyestuffs are characterized in that, for example, their polarizability tensor has an elongated shape.

It is essential to the invention that the sensitivity to actinic light of the dyestuffs according to the invention after the induced birefringence has been written in is retained at a final value, and this sensitivity is at least 5%, preferably 10%, particularly preferably 15%, especially preferably 20% of the original value when the longitudinal axis of the molecule lies perpendicular to the direction of polarization of the actinic light.

Rewriting on the recording material several times is possible in this way: The light-induced birefringence value achieved after the deletion operation achieves a value which differs from the previous value by at most 20%, preferably 10%, particularly preferably 5%, and especially preferably by not more than 1%.

The capacity for being rewritten on several times is understood as meaning that at least 2, preferably at least 10, particularly preferably at least 100, and especially preferably at least 1,000 writing/deletion cycles are carried out.

The grouping which interacts with the electromagnetic radiation is an azo dyestuff. The material according to the invention consequently comprises at least one azo dyestuff.

Azo dyestuffs have, for example, the following structure of the formula (I)

wherein
$R^1$ and $R^2$ independently of one another represent hydrogen or a nonionic substituent and
m and n independently of one another represent an integer from 0 to 4, preferably 0 to 2,
$X^1$ and $X^2$ denote $X^{1'}$—$R^3$ or $X^{2'}$—$R^4$,
wherein
$X^{1'}$ and $X^{2'}$ represent a direct bond, —O—, —S—, —(N—$R^5$)—, —C($R^6R^7$)—, —(C=O)—, —(CO—O)—, —(CO—N$R^5$)—, —(SO$_2$)—, —(SO$_2$—O)—, —(SO$_2$—N$R^5$)—, —(C=N$R^8$)— or —(CN$R^8$—N$R^5$)—,
$R^3$, $R^4$, $R^5$ and $R^8$ independently of one another represent hydrogen, $C_1$- to $C_{20}$-alkyl, $C_3$- to $C_{10}$-cycloalkyl, $C_2$- to $C_{20}$-alkenyl, $C_6$- to $C_{10}$-aryl, $C_1$- to $C_{20}$-alkyl-(C=O)—, $C_3$- to $C_{10}$-cycloalkyl-(C=O)—, $C_2$- to $C_{20}$-alkenyl-(C=O)—, $C_6$- to $C_{10}$-aryl-(C=O)—, $C_1$- to $C_{20}$-alkyl-(SO$_2$)—, $C_3$- to $C_{10}$-cycloalkyl-(SO$_2$)—, $C_2$- to $C_{20}$-alkenyl-(SO$_2$)— or $C_6$- to $C_{10}$-aryl-(SO$_2$)— or
$X^{1'}$—$R^3$ and $X^{2'}$—$R^4$ can represent hydrogen, halogen, cyano, nitro, $CF_3$ or $CCl_3$, $R^6$ and $R^7$ independently of one another represent hydrogen, halogen, $C_1$- to $C_{20}$-alkyl, $C_1$- to $C_{20}$-alkoxy, $C_3$- to $C_{10}$-cycloalkyl, $C_2$- to $C_{20}$-alkenyl or $C_6$- to $C_{10}$-aryl.

Nonionic substituents are to be understood as meaning halogen, cyano, nitro, $C_1$- to $C_{20}$-alkyl, $C_1$- to $C_{20}$-alkoxy, phenoxy, $C_3$- to $C_{10}$-cycloalkyl, $C_2$- to $C_{20}$-alkenyl or $C_6$- to $C_{10}$-aryl, $C_1$- to $C_{20}$-alkyl-(C=O)—, $C_6$- to $C_{10}$-aryl-(C=O)—, $C_1$- to $C_{20}$-alkyl-(SO$_2$)—, $C_1$- to $C_{20}$-alkyl-(C=O)—O—, $C_1$- to $C_{20}$-alkyl-(C=O)—NH—, $C_6$- to $C_{10}$-aryl-(C=O)—, NH—$C_1$- to $C_{20}$-alkyl-O—(C=O)—, $C_1$- to $C_{20}$-alkyl-NH—(C=O)— or $C_6$- to $C_{10}$-aryl-NH—(C=O)—.

The alkyl, cycloalkyl, alkenyl and aryl radicals in turn can be substituted by up to 3 radicals from the series consisting of halogen, cyano, nitro, $C_1$- to $C_{20}$-alkyl, $C_1$- to $C_{20}$-alkoxy, $C_3$- to $C_{10}$-cycloalkyl, $C_2$- to $C_{20}$-alkenyl or $C_6$- to $C_{10}$-aryl, and the alkyl and alkenyl radicals can be straight-chain or branched.

Halogen is to be understood as meaning fluorine, chlorine, bromine and iodine, in particular fluorine and chlorine.

The recording material according to the invention is preferably a polymeric or oligomeric organic, amorphous material, particularly preferably a side-chain polymer.

The main chains of the side-chain polymers originate from the following base structures: polyacrylate, polymethacrylate, polysiloxane, polyurea, polyurethane, polyester or cellulose. Polyacrylate and polymethacrylate are preferred.

The dyestuffs, in particular the azo dyestuffs of the formula (I), are bonded covalently to these polymer matrices, as a rule via a spacer. For example, $X^1$ (or $X^2$) then represents such a spacer, in particular in the meaning $X^{1'}$-$(Q^1)_i$-$T^1$-$S^1$—, wherein $X^{1'}$ has the abovementioned meaning, $Q^1$ represents —O—, —S—, —(N—$R^5$)—, —C($R^6R^7$)—, —(C=O)—, —(CO—O)—, —(CO—NR$^5$)—, —(SO$_2$)—, —(SO$_2$—O)—, —(SO$_2$—NR$^5$)—, —(C=NR$^8$)—, —(CNR$^{8-NR5}$)—, —(CH$_2$)$_p$—, p- or m-C$_6$H$_4$— or a divalent radical of the formula i represents an integer from 0 to 4, where for i>1 the individual $Q^1$ can have different meanings, $T^1$ represents —(CH$_2$)$_p$—, where the chain can be interrupted by —O—, —NR$^9$— or —OSiR$^{10}_2$O—, $S^1$ represents a direct bond, —O—, —S— or —NR$^9$—, p represents an integer from 2 to 12, preferably 2 to 8, in particular 2 to 4, $R^9$ represents hydrogen, methyl, ethyl or propyl, $R^{10}$ represents methyl or ethyl and $R^5$ to $R^8$ have the abovementioned meaning.

Preferred dyestuff monomers for polyacrylates or -methacrylates then have the formula (II)

wherein

R represents hydrogen or methyl and the other radicals have the abovementioned meaning.

Particularly suitable dyestuff monomers are those of the following formula (IIa)

wherein $X^3$ denotes CN and all other known electron-attracting substituents, and $R^1$ is then preferably also CN, and the radicals R, $S^1$, $T^1$, $Q^1$, $X^1$ and $R^2$ and i, m and n have the above-mentioned meaning.

The polymeric or oligomeric organic, amorphous material according to the invention can carry, in addition to the dyestuffs, for example of the formula (I), groupings having form anisotropy. These are also bonded covalently to the polymer matrices, as a rule via a spacer.

Groupings having form anisotropy have, for example, the structure of the formula (III)

wherein Z represents a radical of the formula wherein

A represents O, S or N—$C_1$- to $C_4$-alkyl, $X^3$ represents —$X^{3'}$-$(Q^2)_j$-$T^2$-$S^2$—, $X^4$ represents $X^{4'}$—$R^{13}$, $X^{3'}$ and $X^{4'}$ independently of one another represent a direct bond, —O—, —S—, —(N—$R^5$)—, —C($R^6R^7$)—, —(C=O)—, —(CO—O)—, —(CO—$NR^5$)—, —($SO_2$)—, —($SO_2$—O)—, —($SO_2$—$NR^5$)—, —(C=$NR^8$)— or —($CNR^8$—$NR^5$)—, $R^5$, $R^8$ and $R^{13}$ independently of one another represent hydrogen, $C_1$- to $C_{20}$-alkyl, $C_3$- to $C_{10}$-cycloalkyl, $C_2$- to $C_{20}$-alkenyl, $C_6$- to $C_{10}$-aryl, $C_1$- to $C_{20}$-alkyl-(C=O)—, $C_3$- to $C_{10}$-cycloalkyl-(C=O)—, $C_2$- to $C_{20}$-alkenyl-(C=O)—, $C_6$- to $C_{10}$-aryl-(C=O)—, $C_1$- to $C_{20}$-alkyl-($SO_2$)—, $C_3$- to $C_{10}$-cycloalkyl-($SO_2$)—, $C_2$- to $C_{20}$-alkenyl-($SO_2$)— or $C_6$- to $C_{10}$-aryl-($SO_2$)— or $X^{4'}$—$R^{13}$ can represent hydrogen, halogen, cyano, nitro, $CF_3$ or $CCl_3$,

$R^6$ and $R^7$ independently of one another represent hydrogen, halogen, $C_1$- to $C_{20}$-alkyl, $C_1$- to $C_{20}$-alkoxy, $C_3$- to $C_{10}$-cycloalkyl, $C_2$- to $C_{20}$-alkenyl or $C_6$- to $C_{10}$-aryl, Y represents a single bond, —COO—, —OCO—, —CONH—, —NHCO—, —CON($CH_3$)—, —N($CH_3$)CO—, —O—, —NH— or —N($CH_3$)—, $R^{11}$, $R^{12}$, $R^{15}$ independently of one another represent hydrogen, halogen, cyano, nitro, $C_1$- to $C_{20}$-alkyl, $C_1$- to $C_{20}$-alkoxy, phenoxy, $C_3$- to $C_{10}$-cycloalkyl, $C_2$- to $C_{20}$-alkenyl or $C_6$- to $C_{10}$-aryl, $C_1$- to $C_{20}$-alkyl-(C=O)—, $C_6$- to $C_{10}$-aryl-(C=O)—, $C_1$- to $C_{20}$-alkyl-($SO_2$)—, $C_1$- to $C_{20}$-alkyl-(C=O)—O—, $C_1$- to $C_{20}$-alkyl-(C=O)—NH—, $C_6$- to $C_{10}$-aryl-(C=O)—NH—, $C_1$- to $C_{20}$-alkyl-O—(C=O)—, $C_1$- to $C_{20}$-alkyl-NH—(C=O)— or $C_6$- to $C_{10}$-aryl-NH—(C=O)—, q, r and s independently of one another represent an integer from 0 to 4, preferably 0 to 2, $Q^2$ represents —O—, —S—, —(N—$R^5$)—, —C($R^6R^7$)—, —(C=O)—, —(CO—O)—, —(CO—$NR^5$)—, —($SO_2$)—, —($SO_2$—O)—, —($SO_2$—$NR^5$)—, —(C=$NR^8$)—, —($CNR^8$—$NR^5$)—, —($CH_2$)$_p$—, p- or m-$C_6H_4$— or a divalent radical of the formula j represents an integer from 0 to 4, where for j>1 the individual $Q^1$ can have different meanings, $T^2$ represents —($CH_2$)$_p$—, where the chain can be interrupted by —O—, —$NR^9$— or —$OSiR^{10}_2O$—,

$S^2$ represents a direct bond, —O—, —S— or —$NR^9$—, p represents an integer from 2 to 12, preferably 2 to 8, in particular 2 to 4, $R^9$ represents hydrogen, methyl, ethyl or propyl and $R^{10}$ represents methyl or ethyl.

Monomers with such groupings having form anisotropy which are preferred for polyacrylates or -methacrylates then have the formula (IV)

wherein

R represents hydrogen or methyl and the other radicals have the abovementioned meaning.

Particularly preferred monomers having form anisotropy of the formula (IV) are, for example:

The alkyl, cycloalkyl, alkenyl and aryl radicals can in turn be substituted by up to 3 radicals from the series consisting of halogen, cyano, nitro, $C_1$- to $C_{20}$-alkyl, $C_1$- to $C_{20}$-alkoxy, $C_3$- to $C_{10}$-cycloalkyl, $C_2$- to $C_{20}$-alkenyl or $C_6$- to $C_{10}$-aryl, and the alkyl and alkenyl radicals can be straight-chain or branched.

Halogen is to be understood as meaning fluorine, chlorine, bromine and iodine, in particular fluorine and chlorine.

In addition to these functional units, the oligo- or polymers according to the invention can also comprise units which serve chiefly to lower the percentage content of functional units, in particular dyestuff units. In addition to this task, they can also be responsible for other properties of the oligo- or polymers, e.g. the glass transition temperature, liquid crystallinity, film formation properties etc.

For polyacrylates or -methacrylates, such monomers are acrylic or methacrylic acid esters of the formula (V)

wherein

R represents hydrogen or methyl and $R^{14}$ represents optionally branched $C_1$- to $C_{20}$-alkyl or represents a radical containing at least one further acrylic unit.

However, other copolymers can also be present.

Polyacrylates and polymethacrylates according to the invention then comprise as recurring units preferably those of formula (VI), preferably those of formulae (VI) and (VII) or of formulae (VI) and (VIII) or those of formulae (VI), (VII) and (VIII)

wherein the radicals have the abovementioned meaning.

It is also possible for there to be present several of the recurring units of formula (VI) and/or of the recurring units of the formulae (VII) and/or (VIII).

The ratio of amounts between VI, VII and VIII can be as desired. Preferably, the concentration of VI is between 0.1 and 100%, based on the particular mixture, depending on the absorption coefficient of VI. The ratio between VI and VII is between 100:0 and 1:99, preferably between 100:0 and 30:70, especially preferably between 100:0 and 50:50.

The polymers and oligomers according to the invention preferably have glass transition temperatures $T_g$ of at least 40° C. The glass transition temperature can be determined, for example, by the method of B. Vollmer, Grundriβ der Makromolekularen Chemie [Basic Principles of Macromolecular Chemistry], p. 406–410, Springer-Verlag, Heidelberg 1962.

The polymers and oligomers according to the invention have a molecular weight, determined as the weight-average, of 5,000 to 2,000,000, preferably 8,000 to 1,500,000, determined by gel permeation chromatography (calibrated with polystyrene).

As a result of the structure of the polymers and oligomers, the intermolecular interactions of the structural elements of the formula (VI) with one another or of the formulae (VI) and (VII) with one another are established such that the formation of liquid crystal states of order is suppressed and optically isotropic, transparent non-scattering films, foils, sheets or parallelepipeds can be produced. On the other hand, the intermolecular interactions are nevertheless strong enough for a photochemically induced, cooperative, directed reorientation process of the photochromic and non-photochromic side groups to be effected on irradiation with light.

Preferably, the interaction forces which occur between the side groups of the recurring units of the formula (VI) or between those of the formulae (VI) and (VII) are sufficient for the photo-induced change in configuration of the side groups of the formula (VI) to cause a reorientation in the same direction—so-called cooperative—of the other side groups ((VI) and/or (VII)).

Extremely high values of the optical anisotropy can be induced in the optically isotropic amorphous photochromic polymers (Δn to 0.4).

By the influence of actinic light, states of order are generated and modified in the polymers or oligomers and the optical properties are thus modulated.

The light used is polarized light, the wavelength of which lies in the range of the absorption band, preferably in the range of the long wavelength n-π* band of the recurring units of the formula (VI).

The polymers and oligomers can be prepared by processes known from the literature, for example from DD 276 297, DE-A 3 808 430, Makromolekulare Chemie 187, 1327–1334 (1984), SU 887 574, Europ. Polym. 18, 561 (1982) and Liq. Cryst. 2, 195 (1987).

Another method of preparing the recording material or the polymer according to the invention comprises a process in which at least one monomer is polymerized without a further solvent, it preferably being polymerized by free radicals, and the polymerization particularly preferably being initiated by free-radical initiators and/or UV light and/or thermally.

The reaction is carried out at temperatures between 20° C. and 200° C., preferably between 40° C. and 150° C., particularly preferably 50° C. and 100C, and especially preferably at about 60° C.

In a particular embodiment, AIBN is used as a free-radical initiator.

It has often proved favourable to co-employ another, preferably liquid monomer. This is understood as meaning monomers which are liquid at the reaction temperatures and are preferably olefinically unsaturated monomers, particularly preferably based on acrylic acid and methacrylic acid, especially preferably methyl methacrylate.

The content of monomers of the formula (II) in the copolymers is preferably 0.1 to 99.9 wt. %, particularly preferably 0.1 to 50 wt. %, especially preferably 0.1 to 5 wt. %, and in the most favourable case 0.5 to 2 wt. %.

Particularly suitable materials comprise at least one of the polymers of the formula XIII to XX In formulas XIII through XX: p is between 10 and 1,000; in the case of the copolymers x:y is between 10:90 and 90:10, preferably between 30:70, particularly preferably between 40:60 and 60:40; and especially preferably 50:50; and in the case of terpolymers x+y is greater than 10 mol %, preferably greater than 20 mol %, particularly preferably greater than 30 mol %. In an embodiment of the present invention in Formulas XIII through XX, x+y adds up to 100 mol %.

The invention also provides a preparation process for suitable monomers analogous to the formula under example 1.2.

The process is characterized in that terephthalic acid dichloride is stirred with an aminoazobenzene or a substituted aminoazobenzene in at least equimolar amounts at a temperature between room temperature and 110° C. in an inert solvent, e.g. dioxane, the unsymmetric partial amide being formed quantitatively, which can be filtered off with suction immediately. The expert sees immediately that substituted aminoazobenzenes are of course also suitable. The product is optionally washed again with the solvent. An optionally substituted 4-(carboxychloride)-benzoic acid (4'-phenylazo)-benzamide is then obtained.

The invention also provides an unsymmetric terephthalamide prepared in such a way, and the optionally substituted unsymmetric terephthalamide and the acrylate or methacrylate which can be prepared therefrom according to example 1.2.

The invention also provides a monomer according to example 1.3 of the present application, which can of course also be prepared in substituted form.

Films, foils, sheets and parallelepipeds are produced without expensive orientation processes utilizing external fields and/or surface effects being necessary. They can be applied to substrates by spin-coating, dipping, pouring or other coating processes which are technologically easy to conduct, introduced between two transparent sheets by pressing or flowing in, or prepared simply as a self-supporting material by casting or extrusion. Such films, foils, sheets and parallelepipeds can be produced by sudden cooling, i.e. by a cooling rate of >100 K/min, or also from liquid crystal polymers or oligomers which contain structural elements in the sense described by rapid stripping off of the solvent.

Preferred preparation processes for recording materials for binary and/or multibit and/or volume data storage comprise a step in which the storage medium is applied by spin-coating.

Preferred production processes for holographic volume storage systems comprise a step according to a conventional injection moulding process in the range up to 300° C., preferably up to 220° C., particularly preferably 180° C.

The layer thickness is $\geq 0.1$ mm, preferably $\geq 0.5$ mm, particularly preferably $\geq 1$ mm. A particularly preferred preparation process for layers in the millimetre range is the injection moulding process. In this, the polymer melt is forced through a nozzle into a shaping holder, from which it can be removed after cooling.

EXAMPLES

Example 1

Preparation of the Monomers 85.9 g 4-aminodiphenyl ether in 200 ml dioxane are added to a solution of 125 g 4-(2-methacryloyloxy)-ethoxy-benzoic acid chloride in 200 ml dioxane, the mixture is stirred for 2 h and the product is precipitated by pouring the solution into 2 l water. The precipitate is filtered off with suction, dried and purified by recrystallization twice from isopropanol. The yield is 80% of theory. M.p.=123° C.

59 g 4-aminoazobenzene in 400 ml dioxane are added to a solution of 203 g terephthalic acid dichloride in 1,000 ml dioxane and the mixture is stirred for 1 h. The precipitate is filtered off with suction, rinsed with dioxane and dried under a high vacuum at 110° C. for 8 h. The yield of 4-(carboxychloride)-benzoic acid (4'-phenylazo)-benzamide is 92.8 g. M.p.=123° C.

Elemental analysis: $C_{20}H_{14}ClN_3O_2$ (363.81) Calc.: C, 66.03; H, 3.88; C, 19.75; N, 11.55. Found: C, 66.10; H, 4.00; C, 19.70; N, 11.70.

26 g 2-hydroxyethyl methacrylate in 25 ml pyridine are added to a solution of 36.4 g of this substance in 200 ml DMF, the mixture is stirred at 100° C. for 2 h and the product is precipitated by pouring the solution into 1 l water. The precipitate is filtered off with suction, dried and purified by chromatography in toluene/ethyl acetate (1:1) on silica gel. The yield is 40% of theory.

Elemental analysis: $C_{26}H_{23}N_3O_5$, (457.49) Calc.: C, 68.26; H, 5.07; N, 9.18. Found: C, 68.00; H, 5.10; N, 9.20.

1.3

4-Hydroxy-3-bromo-4'-cyanoazobenzene 18.8 g 4-cyanoaniline are heated at 60° C. in 100 ml water. To dissolve the solid, 10 ml conc. hydrochloric acid are added. A further 115 ml hydrochloric acid are then added, the temperature of the solution is brought to 0° C., 52 g nitrosylsulfuric acid are slowly added dropwise and the mixture is stirred for 1 h. This solution is slowly added dropwise to a solution of 27.5 g 2-bromophenol, 100 ml methanol and 100 ml water at 10° C. A pH of 6–6.5 is maintained by simultaneous addition of 10% sodium hydroxide solution. When the addition is complete, the stirred mass is allowed to react for a further hour and the precipitate is filtered off with suction. The product is then washed with water and dried. The yield of 4-hydroxy-3-bromo-4'-cyanoazobenzene is 68 g.

4-(2-Hydroxyethyloxy)-3-bromo-4'-cyanoazobenzene 65 g 4-Hydroxy-3-bromo-4'-cyanoazobenzene are dissolved in 200 ml 4-methyl-2-pentanone at approx. 120° C. 40 g 2-bromoethanol, 45 g potassium carbonate and 0.5 g potassium iodide are added to this solution and the mixture is stirred at 120° C. for 24 h. The product is taken up in chloroform and washed with water. After drying with magnesium sulfate, the solvent is evaporated off on a rotary evaporator and the residue is purified by chromatography on silica gel in toluene/ethyl acetate (4/1).

The yield of 4-(2-hydroxyethyloxy)-3-bromo-4'-cyanoazobenzene is 30.7 g. M.p.=153° C.; $_{max}$=365 nm (DMF).

Elemental analysis: $C_{15}H_{12}BrN_3O_2$ (346.19) Calc.: C, 52.04; H, 3.49; Br, 23.08; N, 12.14. Found: C, 52.30; H, 3.30; Br, 22.90; N, 12.10.

4-(2-Hydroxyethyloxy)-3,4'-dicyanoazobenzene 15 g (4-(2-hydroxyethyloxy)-3-bromo-4'-cyanoazobenzene are dissolved in 25 ml hot DMF. 4.3 g copper cyanide are then added and the reaction mixture is stirred at 140° C. for 5–6 hours. This solution is added to approx. 500 ml of a 13% aqueous ammonia solution and the precipitate is filtered off. The precipitate is dissolved in hot dioxane. The solution is filtered off from the undissolved residue, the dioxane is evaporated off on a rotary evaporator and the product is purified by chromatography on silica gel in toluene/THF (½) and recrystallized once from ethanol. The yield of 4-(2-hydroxyethyloxy)-3,4'-dicyanoazobenzene is 4.5 g. M.p.=138° C.; $_{max}$=356 nm (DMF).

4-(2-Methacryloyloxyethyloxy)-3,4'-dicyanoazobenzene

5.8 g (4-(2-hydroxyethyloxy)-3,4'-dicyanoazobenzene are dissolved in 15 ml dioxane at 65° C.; 2.4 g triethylamine are added. A solution of 3.1 g methacrylic acid chloride in 3 ml dioxane is added and the reaction mixture is stirred at 65° C. for 2 h and then introduced into 350 ml ice-water. The precipitate is filtered off with suction and dried. Purification is carried out by chromatography on silica gel in toluene/ THF (½). The yield of 4-(2-methacryloyloxyethyloxy)-3,4'-dicyanoazobenzene is 5.9 g. M.p.=110° C.; $_{max}$=352 nm (DMF).

Example 2

Preparation of the Polymers 3 g monomer 1.2 and 0.15 g 2,2'-azoisobutyric acid dinitrile are stirred in 30 ml DMF in an argon atmosphere at 70° C. for 24 h. The polymer is precipitated by pouring the solution into 200 ml water and purified by boiling up in methanol.

Example 3

A glass substrate 1 mm thick is provided with a thin layer of the polymer (see above, example 3). This is effected with the aid of the spin-coating technique. In this procedure, the polymer is dissolved in tetrahydrofuran at a concentration of 50 g/l and the solution is dripped on to the substrate, which is rotating at a speed of rotation of 2,000 min$^{-1}$. The polymer film formed typically has a thickness of 200 nm. Residues of the solvent are removed from the film by storage of the coated glass support for 2 h at 60° C. in a vacuum oven.

The sample prepared in this way is irradiated from the polymer side with polarized laser light incident perpendicularly (writing operation). An argon ion laser (Continuum) at the wavelength of 514 nm is used as the light source. The intensity of this so-called writing laser is 500 mW/cm$^2$. trans-cis-trans Isomerization cycles are induced in the side group molecules of the polymer, which leads to a build up of a net orientation of the molecules away from the direction of polarization of the Ar laser. These molecular dynamics manifest themselves macroscopically in a developing birefringence $\Delta n = n_y - n_x$ in the polymer film plane. The refractive index in the direction of polarization of the laser light ($n_x$) decreases during this process, while the refractive index perpendicular to the direction of polarization ($n_y$) increases. With the stated exposure parameters, the dynamics proceed in the range of minutes.

The course with respect to time of the induced birefringence at a wavelength of 633 nm is determined experimentally with a helium-neon laser (typical intensity: 10 mW/cm$^2$). This operation is called reading the birefringence. The light of this so-called reading laser incident on the polymer layer occupies a fixed angle of between 15° and 35° to the perpendicular of the layer. The reading and writing light overlap on the polymer layer. The direction of polarization of the reading light occupies an angle in the polymer film plane of 45° to the polarization of the writing light. It is rotated on passing through the polymer layer if the layer is birefringent. This rotation is accompanied by an increase in the reading light intensity $I_s$ after an analyser, which is in the beam path after the sample and allows through light perpendicular to the original direction of polarization. The intensity $I_p$ decreases to the same extent as $I_s$ increases. $I_p$ is defined as the transmitted intensity after an analyser which is positioned likewise but which selects the original direction of polarization of the reading laser. The two contents of the direction of polarization parallel and perpendicular to the original direction are detected by experiment separately via a polarizing beam divider and with the aid of two Si photodiodes. The birefringence Δn is calculated from the intensities measured via the following relationship:

$$\Delta n = \frac{\lambda}{\pi d} \arcsin \sqrt{\frac{I_s}{I_s + I_p}}$$

wherein d designates the thickness of the polymer layer and λ=633 nm, the light wavelength of the reading laser. In this formula, it is assumed by approximation that reading is carried out perpendicularly to the polymer layer.

Figure 1:
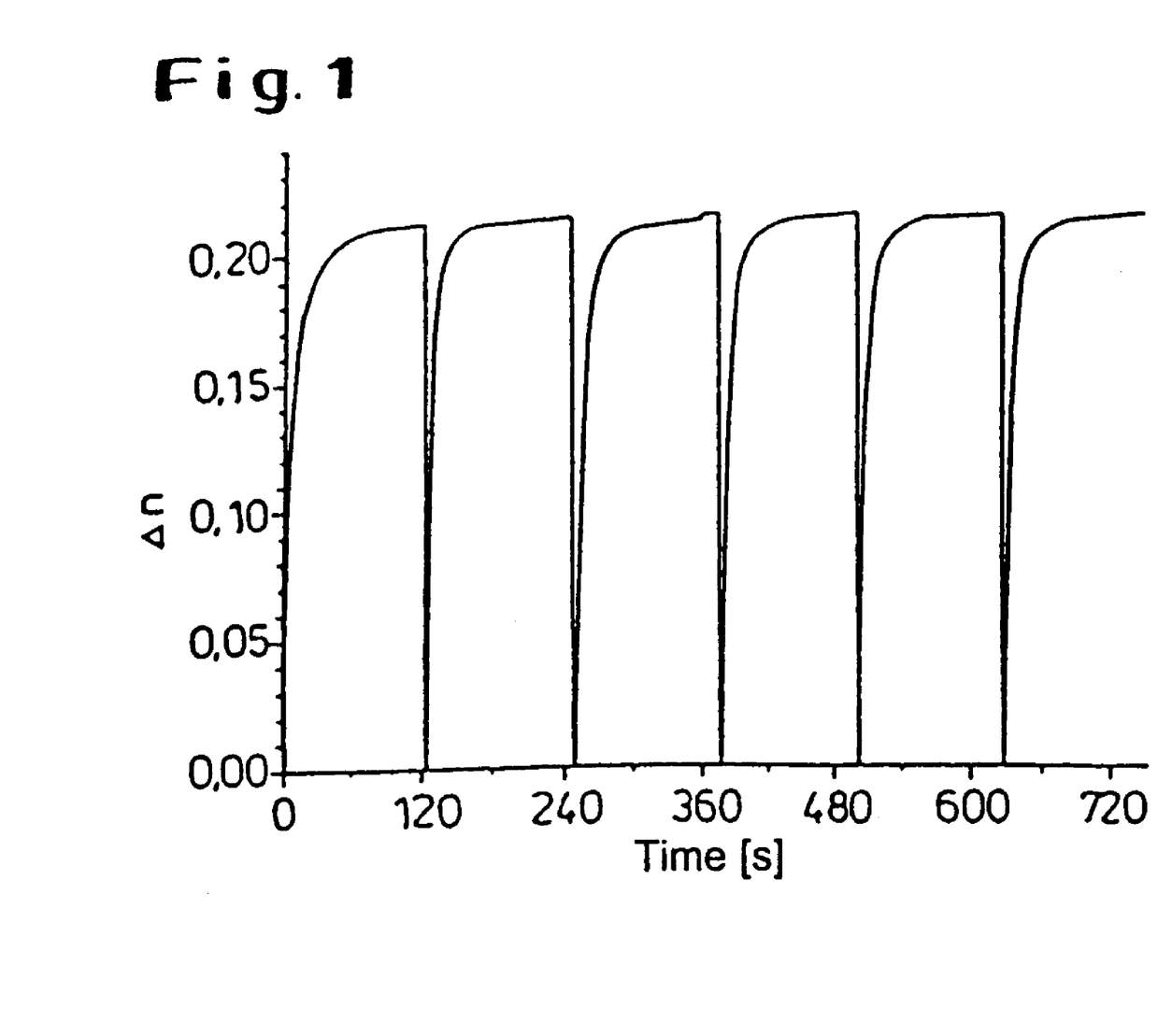
FIG. 1 is a graphical representation of $\Delta n$ (birefringence) as a function of time during repetitive writing/deletion experiments performed on an optical recording material according to the present invention, as represented by Example 3 herein.

FIG. 1 shows the monotonous increase with respect to time of the birefringence Δn of a layer of the polymer from example 3 during writing/deletion experiments. A high birefringence value indicates a high anisotropy in the orientation distribution of the chromophor in the film plane. After exposure of the sample to the light of the writing laser for 2 minutes, the first writing operation is concluded. The resulting phase shift Δφ=2πΔn d/λ during this and subsequent writing operations does not exceed the value Δφ=π. The birefringence n of the polymer layer has reached virtually a maximum value of Δn=0.213±0.002 after 2 min.

Δn is deleted by rotating the direction of polarization of the writing light through 90°. This deletion operation is concluded as soon as: Δn=0. This is equivalent to a value $I_s$=0, which is detected via a diode. The deletion is effected here significantly faster than the writing.

Further writing/deletion operations follow these first directly in the same pattern, and the diode signals are recorded and the birefringence calculated. It can be seen in FIG. 1 that the build up of the birefringence in the second and all subsequent writing operations is comparable in speed and level in the context of measurement accuracy.

The polymer therefore does not bleach out, which would be deduced from a successive decrease in the birefringence.

The invention claimed is:

1. An optical recording material for at least one of binary, multibit and volume data storage, comprising:
    (a) at least one dyestuff selected from polymeric azo dyestuffs, said dyestuff changing its spatial arrangement upon irradiation with polarized electromagnetic radiation; and
    (b) optionally at least one grouping having form anisotropy,
    wherein,
        (i) the absorption maximum of the dyestuff is at least one of, at least 30 nm less than 400 nm and at least 30 nm greater than 400 nm,
        (ii) at 400 nm the dyestuff reaches an optical density of not more than 60% of its absorption maximum,
        (iii) said optical recording material has the capacity for being rewritten on by changing the state of polarization of actinic light, an intensity of at least 80% of the original value being achieved after a deletion/ rewriting cycle, and
        (iv) wherein at 400 nm, under identical conditions, an optical writing operation upon said optical recording material proceeds no more slowly than at 500 nm, and birefringence values induced during said optical writing operation do not differ from those birefringence values induced at 500 nm by more than 10%, further wherein said polymeric azo dyestuff is a polymer represented by the following formula XIV, and p being between 10 and 1,000.

2. The optical recording material of claim 1 wherein said optical recording material is optically written upon using electromagnetic radiation that is light in a laser wavelength range of between 380 to 420 nm.

3. A storage system comprising the optical recording material of claim 1.

4. The storage system of claim 3 wherein said storage system further comprises a reflection layer.

5. An optical recording material for at least one of binary, multibit and volume data storage, comprising:
   (a) at least one dyestuff selected from polymeric azo dyestuffs, said dyestuff changing its spatial arrangement upon irradiation with polarized electromagnetic radiation; and
   (b) optionally at least one grouping having form anisotropy,
   wherein,
   (i) the absorption maximum of the dyastuff is at least one of, at least 30 nm less than 400 nm and at least 30 nm greater than 400 nm,
   (ii) at 400 nm the dyestuff reaches an optical density of not more than 60% of its absorption maximum,
   (iii) said optical recording material has the capacity for being rewritten on by changing the state of polarization of actinic light, an intensity of at least 80% of the original value being achieved after a deletion/rewriting cycle, and
   (iv) wherein at 400 nm, under identical conditions, an optical writing operation upon said optical recording material proceeds no more slowly than at 500 nm, and birefringence values induced during said optical writing operation do not differ from those birefringence values induced at 500 nm by more than 10%,
further wherein said polymeric azo dyestuff is a polymer represented by the following formula XV,

XV wherein the molar ratio of x:y is between 10:90 and 90:10.

6. The optical recording material of claim 5 wherein said optical recording material is optically written upon using electromagnetic radiation that is light in a laser wavelength range of between 380 to 420 nm.

7. A storage system comprising the optical recording material of claim 5.

8. The storage system of claim 7 wherein said storage system further comprises a reflection layer.

9. An optical recording material for at least one of binary, multibit and volume data storage, comprising:
   (a) at least one dyestuff selected from polymeric azo dyestuffs, said dyestuff changing its spatial arrangement upon irradiation with polarized electromagnetic radiation; and
   (b) optionally at least one grouping having form anisotropy,
   wherein,
   (i) the absorption maximum of the dyestuff is at least one of, at least 30 nm less than 400 nm and at least 30 nm greater than 400 nm,
   (ii) at 400 nm the dyestuff reaches an optical density of not more than 60% of its absorption maximum,
   (iii) said optical recording material has the capacity for being rewritten on by changing the state of polarization of actinic light, an intensity of at least 80% of the original value being achieved after a deletion/rewriting cycle, and
   (iv) wherein at 400 nm, under identical conditions, an optical writing operation upon said optical recording material proceeds no more slowly than at 500 nm, and birefringence values induced during said optical writing operation da not differ from those birefringence values induced at 500 nm by more than 10%,
further wherein said polymeric azo dyestuff is a polymer represented by the following formula XVI,

XVI wherein the molar ratio of x:y is between 10:90 and 90:10.

10. The optical recording material of claim 9 wherein said optical recording material is optically written upon using electromagnetic radiation that is light in a laser wavelength range of between 380 to 420 nm.

11. A storage system comprising the optical recording material of claim 9.

12. The storage system of claim 11 wherein said storage system further comprises a reflection layer.

* * * * *